US007462012B2

(12) United States Patent
Hart et al.

(10) Patent No.: US 7,462,012 B2
(45) Date of Patent: Dec. 9, 2008

(54) STACK TRANSFER DEVICE

(75) Inventors: Colin R. Hart, Klive, IA (US); Kenneth M. Welborn, Charlottesville, VA (US); Jimmy L. Meyer, Waynesboro, VA (US)

(73) Assignee: F.R. Drake Company, Waynesboro, VA (US)

( * ) Notice: Subject to any disclaimer, the term of this patent is extended or adjusted under 35 U.S.C. 154(b) by 250 days.

(21) Appl. No.: 10/143,844

(22) Filed: May 14, 2002

(65) Prior Publication Data

US 2002/0182050 A1    Dec. 5, 2002

Related U.S. Application Data

(60) Provisional application No. 60/290,342, filed on May 14, 2001.

(51) Int. Cl.
*B65G 57/00*    (2006.01)

(52) U.S. Cl. .................... 414/790.9; 414/754; 414/782; 414/783; 198/409; 198/418.5; 198/468.2; 198/468.6; 53/247; 53/475

(58) Field of Classification Search ............. 414/789.9, 414/779, 782, 790, 790.1, 790.9, 799, 754, 414/763, 764, 766, 767, 783; 198/409, 418.5, 198/468.2, 468.6; 356/244, 426; 53/242, 53/247, 475
See application file for complete search history.

(56) References Cited

U.S. PATENT DOCUMENTS

| | | | | |
|---|---|---|---|---|
| 3,753,505 A | * | 8/1973 | Ouska | 414/778 |
| 3,758,934 A | * | 9/1973 | Hasselgren et al. | 29/426.2 |
| 3,825,134 A | * | 7/1974 | Stobb | 414/802 |
| 3,866,741 A | | 2/1975 | Carbon et al. | |
| 3,902,609 A | * | 9/1975 | Ohlsson | 414/788.3 |
| 3,946,880 A | * | 3/1976 | Schmitt | 414/795.9 |
| 3,967,739 A | * | 7/1976 | Kumagai | 414/788.5 |
| 3,988,875 A | | 11/1976 | Fay | |
| 4,049,259 A | * | 9/1977 | Ventz | 271/151 |
| 4,364,467 A | * | 12/1982 | Blakelock | 198/429 |
| 4,538,511 A | * | 9/1985 | Wise | 100/7 |
| 4,573,863 A | * | 3/1986 | Picotte | 414/763 |
| 4,755,093 A | * | 7/1988 | Francioni | 414/788.4 |
| 4,827,692 A | * | 5/1989 | Fiske et al. | 53/244 |
| 4,911,608 A | * | 3/1990 | Krappitz et al. | 414/796 |
| 5,018,338 A | | 5/1991 | Jurchuk et al. | |
| 5,069,019 A | | 12/1991 | Lodewegen | |
| 5,088,877 A | * | 2/1992 | Henk | 414/626 |

(Continued)

OTHER PUBLICATIONS

U.S. Appl. No. 10/143,844, filed May 14, 2002, Hart, et al.

*Primary Examiner*—Michael S Lowe
(74) *Attorney, Agent, or Firm*—Berenato, White & Stavish, LLC

(57) ABSTRACT

A transfer device is disclosed for transferring a plurality of stacks of disk-like objects such as frozen hamburger patties, from a plurality of first trays having bottom walls angled with respect to horizontal to a horizontal support platform spaced from the trays. The transfer device includes a support frame having wheels that is movable between first and second ends of a guide track and a pivotal frame pivotally attached to the support frame which pivotal frame supports upper and lower grippers for engaging the upper and lower sides of a plurality of stacks of objects and securely holding the stacks of objects as they are moved between first and second positions.

14 Claims, 9 Drawing Sheets

U.S. PATENT DOCUMENTS

| | | |
|---|---|---|
| 5,131,803 A | 7/1992 | Banek |
| 5,244,330 A * | 9/1993 | Tonjes .................. 414/331.01 |
| 5,354,170 A * | 10/1994 | Schweingruber et al. .... 414/790 |
| 5,358,372 A * | 10/1994 | Meredith .................... 414/778 |
| 5,547,335 A * | 8/1996 | Lovett et al. ............ 414/795.6 |
| 5,709,067 A * | 1/1998 | Dey et al. .................... 53/430 |
| 5,743,374 A * | 4/1998 | Monsees .................... 198/403 |
| 5,765,337 A | 6/1998 | Lodewegen et al. |
| 5,809,745 A | 9/1998 | Reinert |
| 5,878,864 A * | 3/1999 | Feldkamper ................ 198/409 |
| 6,052,969 A | 4/2000 | Hart et al. |
| 6,247,694 B1 * | 6/2001 | Nonnemacher et al. ..... 271/146 |
| 6,322,316 B1 | 11/2001 | Hart et al. |
| 6,497,549 B2 * | 12/2002 | Brown .................... 414/790.3 |
| 2004/0206054 A1 * | 10/2004 | Welborn et al. ............... 53/475 |

* cited by examiner

STACK TRANSFER DEVICE

CROSS-REFERENCE TO RELATED APPLICATIONS AND CLAIM TO PRIORITY

The present application claims the benefit of U.S. provisional patent application Ser. No. 60/290,342, filed May 14, 2001, the disclosure of which is incorporated by reference.

FIELD OF THE INVENTION

The present invention is directed toward a method and apparatus for moving a plurality of stacks of objects from a first location to a second location, and more specifically, toward a method and apparatus for gripping the tops and bottoms of a plurality of stacks of objects arranged in a row, removing the stacks from a plurality of individual stack holding devices at a first location and transferring the stacks to a support at a second location.

BACKGROUND OF THE INVENTION

Various machines have been developed for processing disk-like objects such as hamburger patties. These devices generally receive a stream of patties from a conveyor belt and form them into stacks. After the stacks are formed, however, they often must be removed manually from the stack-forming machine and placed in a box or other container or set aside for further processing. The need for human labor in this process slows the process, increases its cost, and can result in inconsistent stack sizes and boxes packed with too few or too many patties.

A stack-forming machine is disclosed in a co-pending application entitled "Method and Apparatus for Stacking Discrete Planar Objects" filed concurrently herewith and assigned to the assignee of this application. The disclosure thereof is incorporated herein by reference. This stack-forming machine forms stacks having a certain number of patties and moves the formed stacks into a buffer which is disclosed in a co-pending application entitled "Method and Apparatus for Buffering A Flow of Objects" filed concurrently herewith. The disclosure of that application too is hereby incorporated by reference. This buffer receives a first number of stacks of patties from a stack-forming machine and presents a second, generally different number of stacks at a second location so that this second number of stacks can be placed into cases. For example, if a stacking machine forms four stacks of patties at a time and a case of patties is only three patties wide, the buffer receives four stacks of patties and presents them in groups of three for further processing. While the stacks could be manually removed from the buffer and placed in cases, this use of human labor decreases the efficiency of the packing process. It would therefore be desirable to provide a stack transfer device for removing stacks of disk-like objects such as frozen hamburger patties from a buffer or stack-forming machine and transferring the stacks to a second location from which they can be packed into a case.

SUMMARY OF THE INVENTION

These problems and others are addressed by the present invention which comprises a method and apparatus for gripping a plurality of stacks of discrete objects and moving them from a first location to a second location. While such a device could be used to move one or more stacks of almost any type of flat objects from one location to another, it is particularly suited for use in moving frozen hamburger patties and will be described herein in terms of such objects, it being understood that the invention can be used in other environments with other objects as well.

In the preferred embodiment, the invention comprises a generally rectangular frame having parallel top and bottom members, a plurality of stack supports mounted on the bottom member and a plurality of actuators supporting plates depending from the top member. The actuators cause the plates to move toward and away from the bottom member, and the bottom member itself is also movable relative to the top member via additional actuators. The frame is shiftable between a first location where it engages several stacks of patties, and a second location where the stacks are deposited for further processing. In the preferred embodiment, the stacks at the first location are located in individual holders which are oriented at a small angle to the vertical such that the stacks are supported by both a bottom wall and a side wall. The second location comprises a shelf-like member on which the stacks are supported by the lowermost patty in the stack. The frame is also pivotable about an axis parallel to the bottom frame member, so that it can shift the stacks from a first vertical orientation to a second.

In operation, the frame moves and pivots until it substantially surrounds a plurality of stacks of patties, and so that the support members on the lower frame member are positioned beneath slots in the bottoms of the patty holders and so the plates are located over the tops of each of the stacks. Actuators then move the bottom frame member up against the bottoms of the stacks and move the plates against the tops of the stacks to grip each stack between one bottom frame stack support member and a plate. The frozen patties have relatively rough surfaces, and therefore only a small amount of pressure needs to be applied to hold the stacks securely together while they are being moved. If the objects in the stacks were formed of a low-friction material, a greater force would be required to compress the stacks and keep them together. The frame next pivots about an axis below and parallel to the bottom frame member, and moves away from the individual stack holders to a second location where the patties are to be deposited. In the preferred embodiment, the second location comprises a matrix former which receives several stacks of patties and arranges the stacks for placement into a case or other container. The matrix former includes a generally horizontal lower wall with slots wider than the bottom frame member stack supports, but narrower than the width of the stacks, and three sidewalls extending away from the lower wall, which side walls are movable relative to the bottom wall to square the stacks on the lower wall. The distance between the frame side members is greater than the distance between the matrix former side walls, so the frame surrounds the matrix former as the stacks are deposited thereon. When the bottom walls of the stacks are located over the lower wall of the matrix former, the frame bottom moves away from the stack bottoms to deposit the stacks on the lower wall and the plates are also moved away from the top of the stacks. The transfer mechanism then returns to the first location where another set of stacks has been moved into position for transfer and repeats the above process, this time leaving the second group of stacks on the matrix former at a third location between the first location and the second location one patty diameter closer to the first location than the second location. The matrix former then squares the stacks and they are boxed and removed from the matrix former after which the process repeats.

It is therefore a primary object of the present invention to provide an apparatus for transferring a plurality of stacks of discrete objects from a first location to a second location.

It is another object of the invention to provide a method of transferring a plurality of stacks of discrete objects from a first location to a second location.

It is a further object of the invention to provide an apparatus for orienting a plurality of stacks of objects as the objects are moved from a first location to a second location.

It is still another object of the present invention to provide an apparatus for removing a plurality of stacks from a plurality of individual stack holders and moving those removed stacks to a receiver that includes a lower wall and three upstanding sidewalls.

It is still a further object of the present invention to provide an apparatus for transferring a plurality of frozen hamburger patties from a buffer to a matrix former.

It is yet another object of the present invention to provide an apparatus for moving a plurality of stacks of disk-like objects from a plurality of individual stack holders oriented at a first angle with respect to vertical to a box-like receiver having a horizontal lower wall, three generally vertical side walls and a front opening between two of the sidewalls.

In furtherance of these objects, an apparatus is provided for transferring a plurality of stacks of discrete objects from a first holder to a second holder, which apparatus includes a frame having a top and a bottom, a plurality of stack supports on the frame bottom and a plurality of stack-engaging members supported by the frame top. At least one first actuator is provided for moving the plurality of stack-engaging members toward and away from the stack supports, and a second actuator is provided for moving the frame between the first holder and the second holder. A controller for controlling the at least one first actuator and the second actuator is also provided.

Another aspect of the invention comprises a method of moving a plurality of stacks, each having a top and a bottom, of discrete objects from a first location to a second location, which method includes the steps of providing a movable frame that has a top and a bottom and a plurality of lower supports on the frame bottom. The frame is positioned at a first location around a plurality of stacks of discrete objects with one of the lower supports adjacent each of the stack bottoms and with the frame top adjacent the tops of the stacks. Next, at least a portion of the frame top is moved against the stacks to hold the stacks between the frame top and the frame bottom. Then, the frame is moved to the second location, and at least a portion of the frame top is moved away from the stacks to release the stacks at the second location.

A further aspect of the invention comprises an apparatus for transferring a plurality of stacks of discrete objects from a first holder to a second holder. The device includes a frame having a top and a bottom and two sides connecting the top and bottom and defining an opening. A plurality of stack supports are mounted on the frame bottom. A plurality of first actuators is connected to the frame top, each of which supports a plate member in alignment with one of the stack supports and moves each of the plate members toward and away from the stack supports. A second actuator is provided for moving the frame between the first holder and the second holder, and a third actuator is provided for pivoting the frame about an axis parallel to the frame bottom. The device also includes a fourth actuator for moving the frame bottom with respect to the frame sides and a controller for controlling the plurality of first actuators, the second actuator, the third actuator and the fourth actuator.

Another aspect of the invention comprises a method of moving a plurality of parallel stacks of discrete objects from a first location to a second location that involves providing a movable frame having a top and a bottom and a center opening. A plurality of lower supports are provided on the frame bottom and a plurality of actuators are provided on the frame top each of which is connected to a plate member and aligned with one of the plurality of lower supports. The frame is positioned at a first location around a plurality of stacks of discrete objects with one of the plurality of lower supports beneath each one of the plurality of stacks and one of the plate members above each of the stacks. Then the plate members are moved against the stacks to compress each of the stacks between one of the supports and one of the plate members. Next, the frame is pivoted about an axis parallel to the bottom and moved to the second location where the lower supports are moved away from the upper supports to release the stacks at the second location.

BRIEF DESCRIPTION OF THE DRAWINGS

These and other objects and advantages of the invention will be better understood after a reading of the following detailed description of the invention together with the following drawings of which.

DETAILED DESCRIPTION OF THE INVENTION

Figure 1:
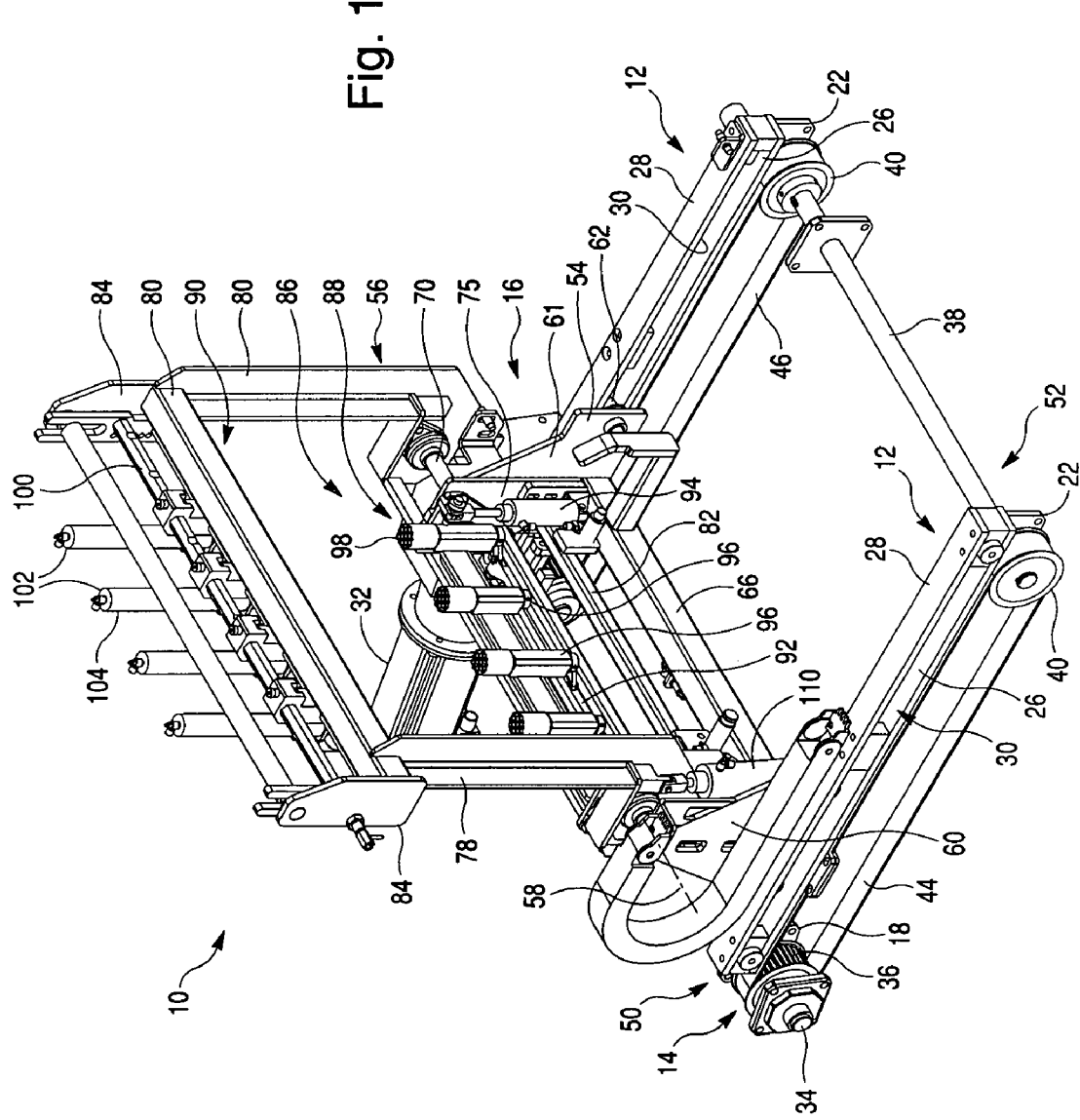
FIG. 1 is a perspective view of a stack transfer device according to the present invention.

Referring now to the drawings, wherein the showings are for the purpose of illustrating a preferred embodiment of the invention only, and not for the purpose of limiting same, FIG. 1 shows a transfer device designated generally by the numeral 10 which includes guide tracks 12, a drive 14, and a carrier 16 which is moved linearly back and forth along the guide tracks 12 by the drive 14. Guide tracks 12 comprise a first pair of feet 18 having aligned openings 20 best seen in FIG. 4 and a second pair of feet 22 having aligned openings 24 best seen in FIG. 3. Two lower rail members 26 connect the first and second pairs of feet, and two upper rail members 28 are mounted above lower rail members 26 to define a guide channel 30 therebetween.

Figure 2:
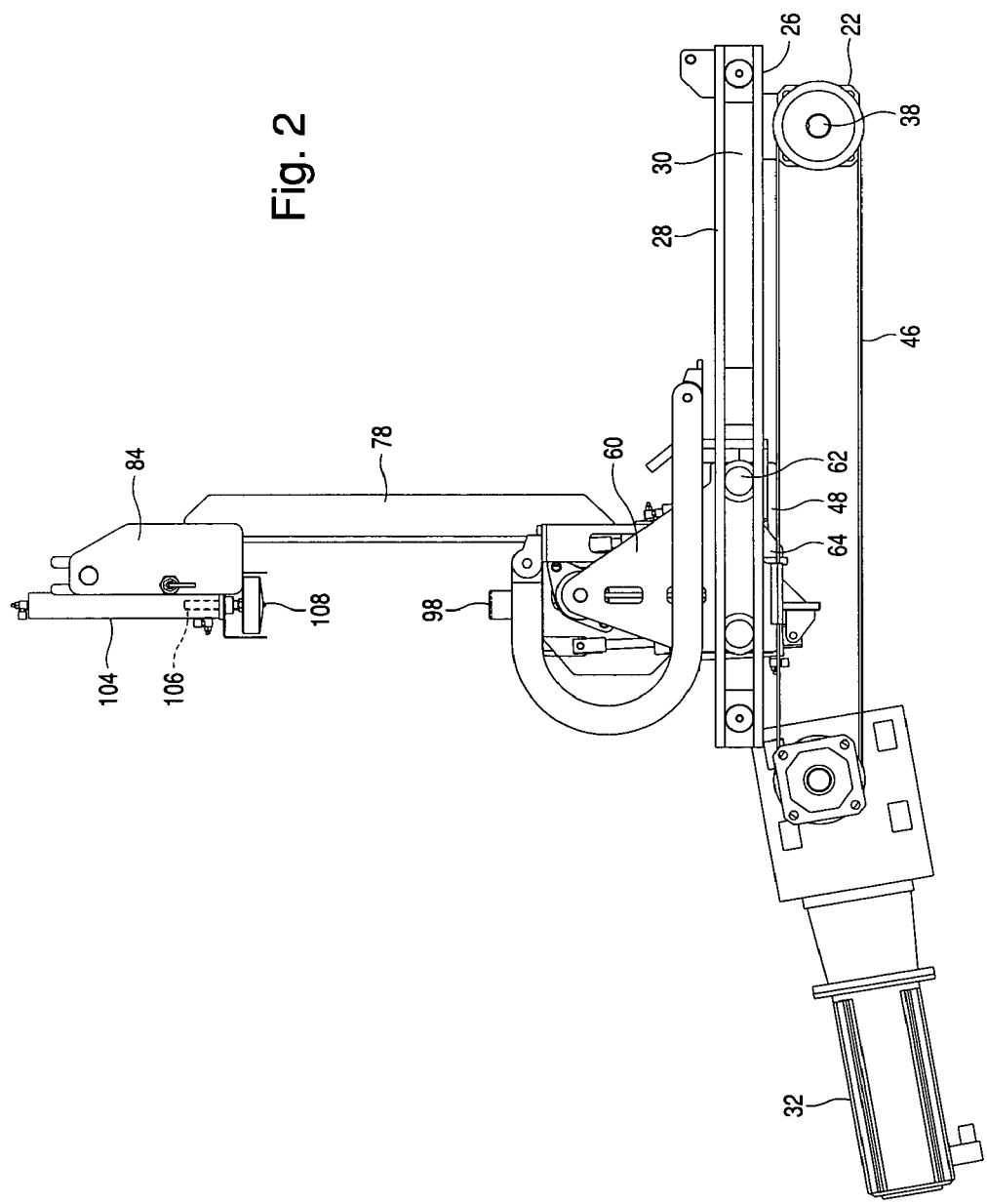
FIG. 2 is a side elevational view of the device of FIG. 1.

Drive 14 comprises a motor 32, a drive shaft 34 extending through aligned openings 20 in the first pair of feet, first and second geared wheels 36 coupled to the drive shaft 34, an axle 38 extending between aligned openings 24 in the second pair of feet, and first and second idler wheels 40 mounted at either end of axle 38. A first belt 44 extends between one of the geared wheels 36 and one of the idler wheels 40, and a second belt 46 extends between the other one of the geared wheels 36 and the other idler wheel 40. The portions of belts 44 and 46 facing the guide tracks 12 include an attachment plate 48 as best shown in FIG. 2. Motor 32 is reversible, and can be driven in a first direction to rotate the geared wheels to drive the belts 44 and 46 in a first direction, to move the attachment plate 48 from a first end 50 of the guide tracks 12 to a second end 52 of the guide tracks, and in a second direction to move the attachment plate 48 back to the first end 50. Carrier 16 is mounted on the guide tracks 12 and attached to attachment plate 48, so that it can be driven between first end 50 and second end 52 by motor 32.

Figure 3:
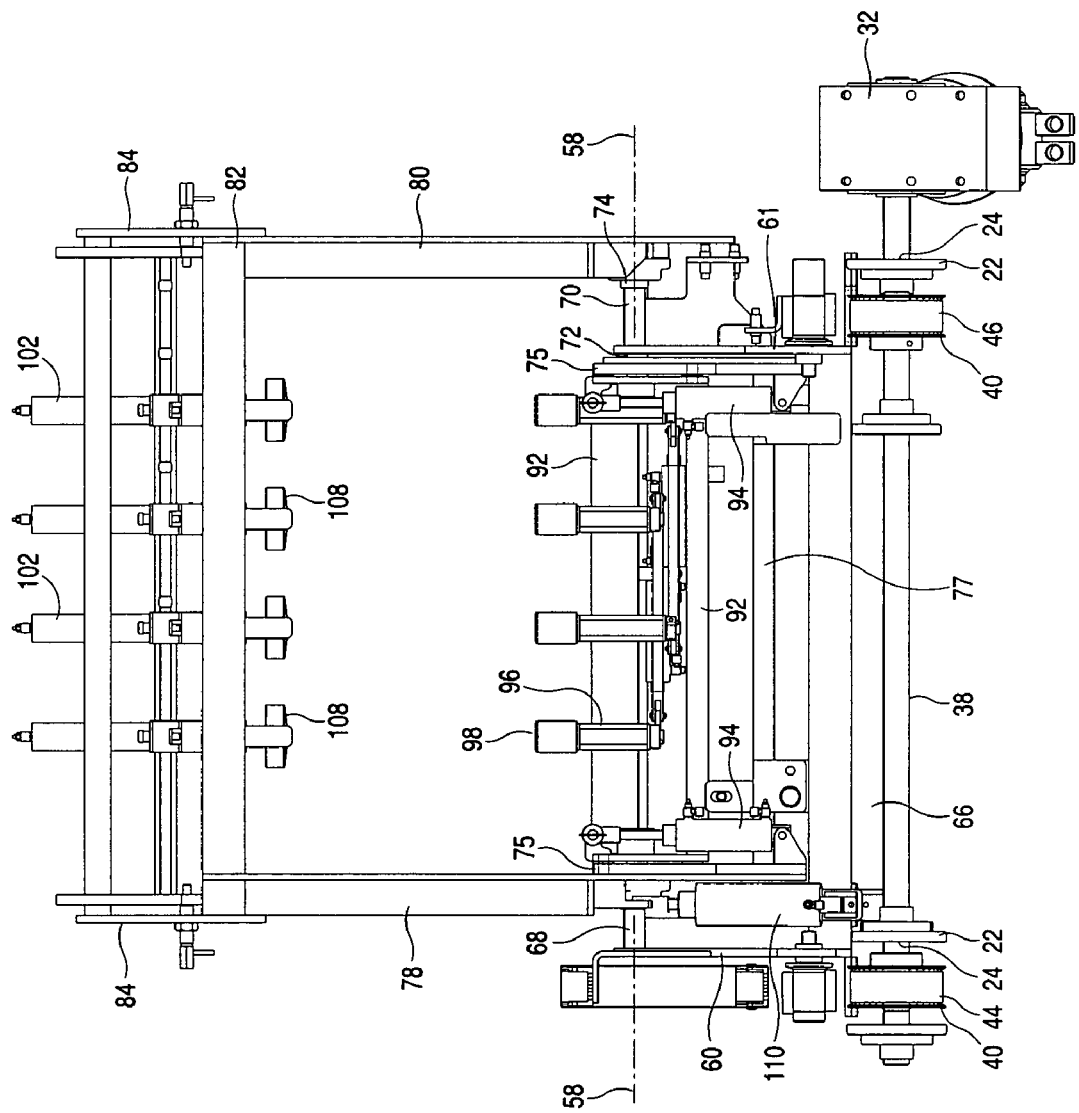
FIG. 3 is a front elevational view of the device of FIG. 1.
Figure 4:
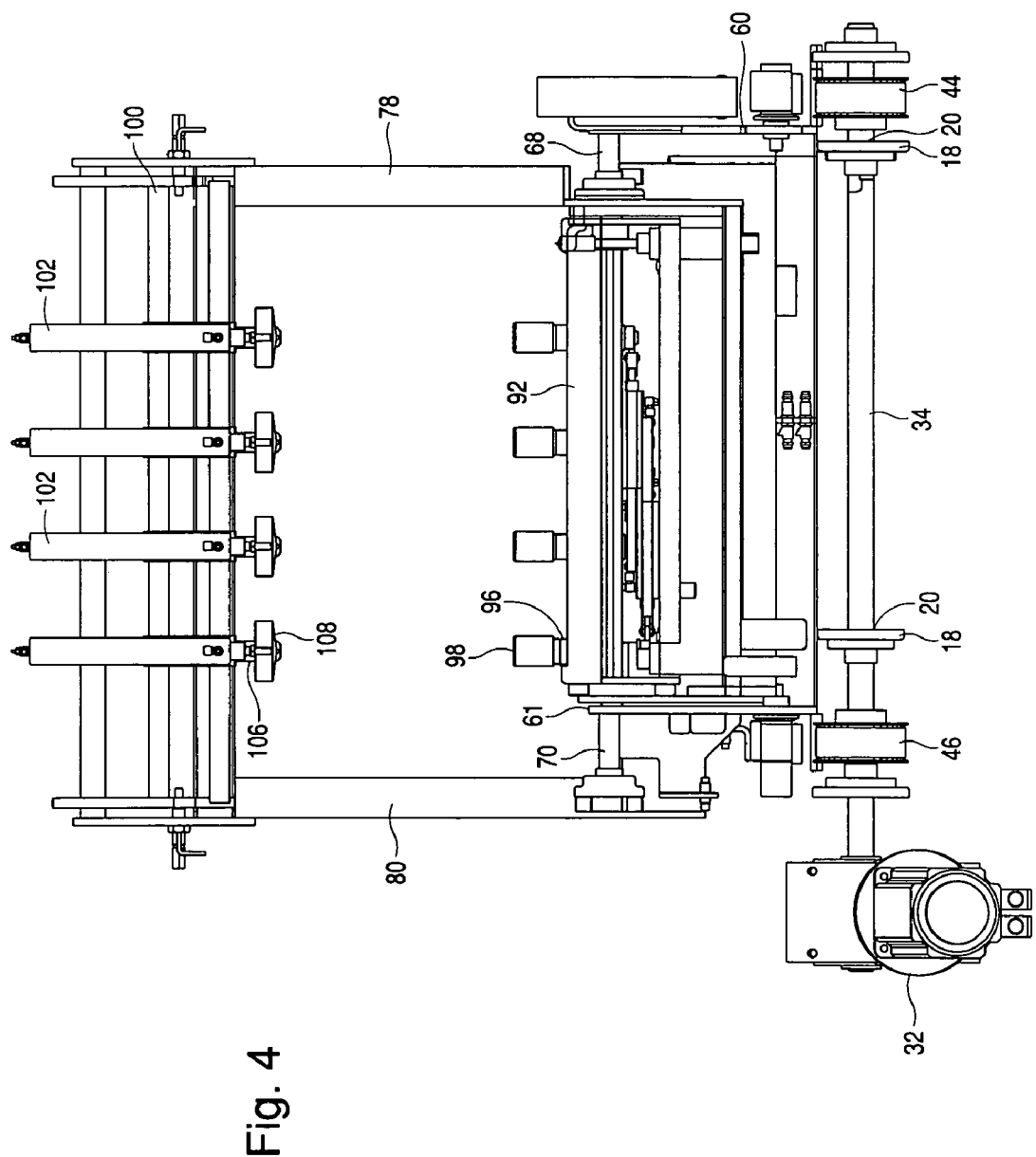
FIG. 4 is a rear elevational view of the device of FIG. 1.
Figure 5:
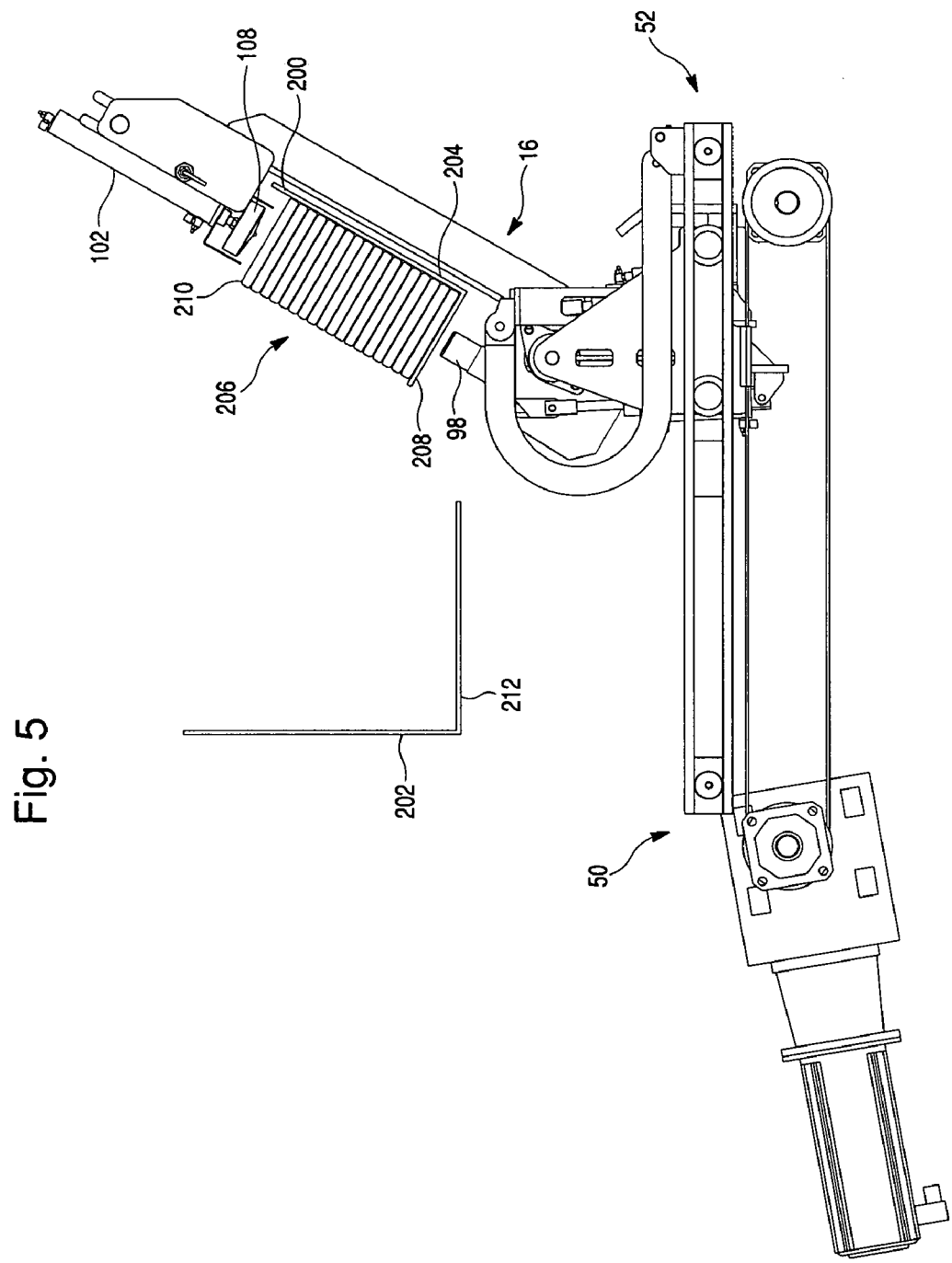
FIG. 5 is a side elevational view of the device of FIG. 1 positioned adjacent a plurality of stacks of hamburger patties on a buffer mechanism.

Carrier 16 comprises a support frame 54 and a pivot frame 56 that is pivotally connected to support frame 54 for pivoting motion about a pivot axis 58 between a first position, shown in FIG. 2, where the support frame is oriented at a right angle to the guide tracks 12 and generally vertically when support feet 18 and 22 rest on a horizontal floor or other support surface, and a second position, shown in FIG. 5, where the frame is tipped about 30 degrees from vertical. As best seen in FIG. 3, support frame 54 includes first and second spaced plate members 60, 61 and a pair of wheels 62 carrying the frame and rotatably attached to each attachment plate 48, which wheels are sized to fit in channel 30 between the upper and lower rail members of the guide tracks 12. A dog 64 depends from each of the attachment plate 48 which dogs 64 are securely fastened to each of the attachment plates 48 on the first and second belts 44 and 46. A lower strut 66 is connected between and carried by the first plate 60 and second plate 61. FIG. 3 shows a first axle 68 projecting inwardly from plate member 60 and a second axle 70 is supported by plate member 61, with an inner end 72 projecting toward first axle 68 and an outer end 74 projecting from the opposite side of the plate member 61. First axle 68 and second axle 70 are coaxially aligned with pivot axis 58.

Pivot frame 56 includes first and second side plate members 75 connected by a lower strut 77, and the side plate members 75 each include an upper portion to which the axles 68 and 70 are attached. First side support 78 projects upwardly from first plate 60 and is fixedly attached to plate 60. A second side support 80, parallel to the first side support, is fixed to outer end 74 of second axle 70. The upper ends of the first and second side supports are connected by a strut 82, and plate members 84 are attached to either end of the strut 82 which plate members form attachment points for elements described below.

A gripper mechanism, designated generally by 86 is carried by pivot frame 56 and comprises a lower gripper member 88 and an upper gripper member 90 as best seen in FIG. 1. In the preferred embodiment, the lower gripper member 88 includes a gripper frame 92 slidingly supported between plate members 60 and 61 of pivot frame 56, and first and second linear actuators 94, preferably pneumatic actuators, connected between the pivot frame 56 and the gripper frame 92 for moving the gripper frame 92 relative to the pivot frame 56. Four stack supports 96, as best shown in FIG. 3, are mounted on the gripper frame 92, each of which includes a stack-engaging top portion 98 adjustably connected thereto. As all of the stack supports 96 are connected to the gripper frame 92, they all move in unison when actuators 94 move the frame. However, it is within the scope of this invention to use individually controllable actuators as well.

Upper gripper member 90, as best seen in FIG. 1, comprises a strut 100 connected between plate members 84 at the top ends of the first and second side supports 78, 80 to which four independently controllable pneumatic actuators 102 are attached at various selectable positions along rod 100, which positions are selected so that the actuators 102 on the upper gripper member 90 are aligned with the stack supports 96 on the gripper frame 92. Each actuator 102 includes a tubular housing 104 within which a piston 106 is mounted for reciprocal motion with respect to the housing. At the end of each piston is mounted a stack-engaging plate member 108 as best shown in FIG. 3. The actuators 102 are connected to a suitable controller, not shown, which moves the pistons 106 to move the plate members 108 between first and second positions with respect to the housing 104. Preferably the same controller that controls the motion of the actuators 94 controls the lower gripper member so that the stack-engaging members 98 of the gripper frame 92 can be moved toward the stack-engaging plates 106 of the upper gripper 90 while the stack-engaging plates 108 of the upper gripper 90 are being moved toward the stack-engaging members 98 of the lower gripper 88 to grip a stack of objects, such as frozen hamburger patties, therebetween. The controller also controls the separation of the upper gripper 90 and the lower gripper 88. A tipper actuator 110 is connected between support frame 54 and pivot frame 56 to tip or pivot the pivot frame between the first and second positions.

The operation of transfer device 10 will now be described with reference to FIGS. 5-9 which figures show device 10 positioned between a buffer device 200 and a matrix former 202. The buffer device 200 includes a plurality of individual trays 204 for supporting a plurality of stacks 206 of frozen hamburger patties, which stacks each include a bottom 208 and a top 210. Only one of the trays and one stack of patties is visible in these figures; however two other holders holding two other stacks of patties are positioned therebehind. The lower portion of each tray 204 is angled with respect to the horizontal to help keep stacks of patties 206 in place while the trays 204 are moved around the buffer device, and the bottom of each tray includes a slot that is narrower than the diameter of the patties in each stack but wide enough to allow the stack-engaging tops 98 of the lower gripper member to pass through the slots and contact the bottoms 208 of the stacks. The matrix former 202 has a horizontal bottom wall 212 and upstanding sidewalls 202 between which the stacks of patties are placed for further processing. The bottom wall 212 includes a plurality of slots narrower than the width of the patties but wider than the stack-engaging tops 98 to allow stacks of patties to be placed on the bottom wall 212 inwardly from the edge thereof. While the transfer device is well suited for use in this environment, it could be used to transfer stacks between other supports as well, one, both, or neither of which are inclined with respect to horizontal.

Figure 6:
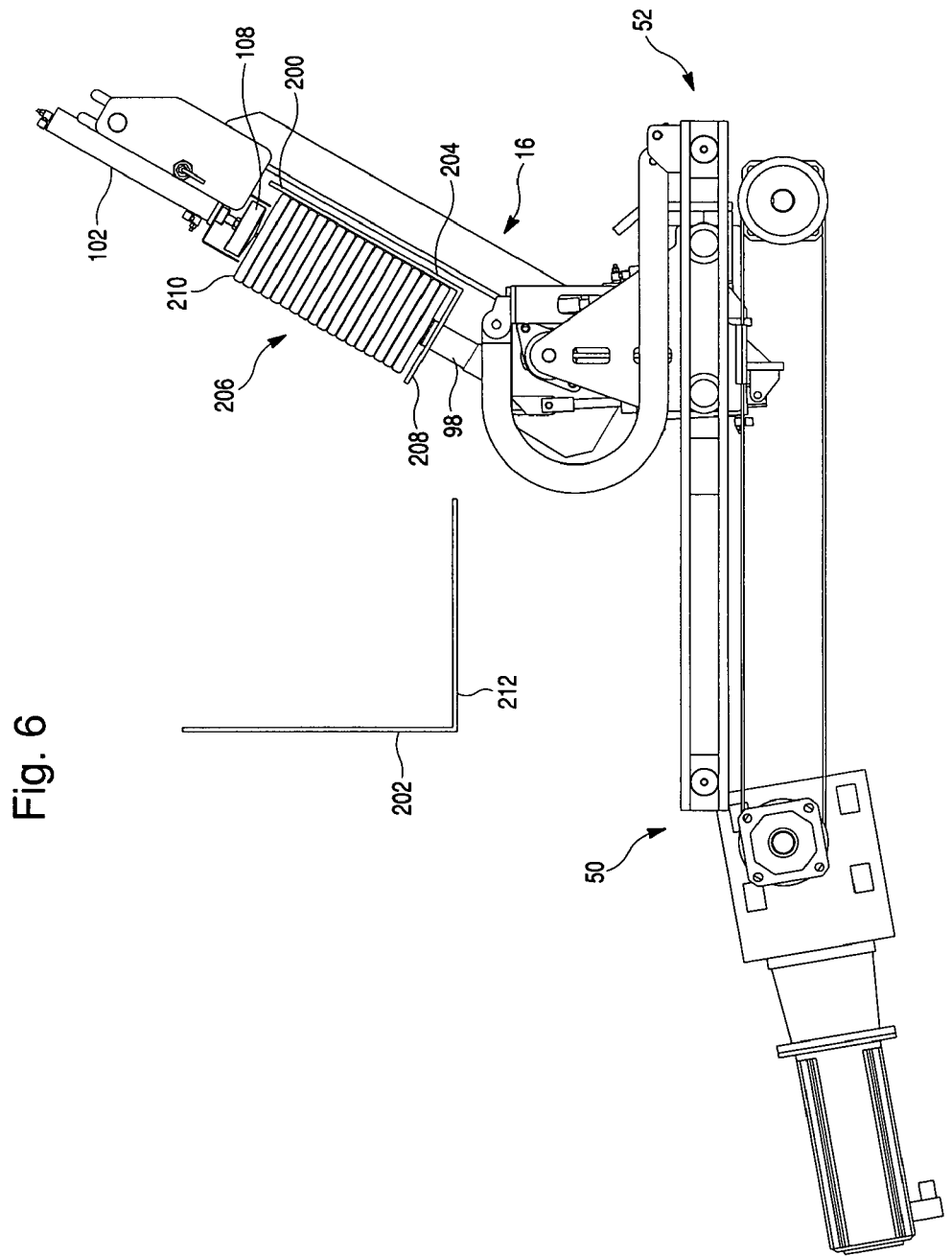
FIG. 6 is a side elevational view of the device of FIG. 1 gripping a plurality of stacks of hamburger patties on a buffer mechanism.

FIG. 5 shows a stack 206 of frozen hamburger patties supported on a tray 204 of a buffer device 200. Carrier 16 is positioned at the second end 52 of the guide track and tilted to the second position, wherein the plane of the stack-engaging surfaces of the lower gripper 88 and the upper gripper 90 are inclined at about a 30 degree angle from vertical and parallel to tray 204. Lower stack-engaging top member 98 is positioned directly under stack bottom 208, while upper stack-engaging plate 108 is positioned over stack top 210. FIG. 6 shows the configuration of device 10 after actuators 94 have raised the lower gripper 88 so that the stack-engaging tops 98 of the lower gripper 88 are in contact with stack bottoms 208, and after actuators 102 have lowered stack-engaging plates 108 into contact with top surfaces 210 of the stacks 206. The upper and lower grippers 90 and 88, respectively, are moved toward one another firmly enough to securely hold the stack 206 therebetween. The distance that the upper and lower grippers are moved toward one another can be a constant based upon the height of the stacks 206, or, alternatively, a pressure sensor can be provided which will stop the movement of the grippers 88 and 90 when a predetermined pressure is applied to the stacks 206. The pressure applied to the stacks 206 must be sufficient to keep the stacks 206 from falling apart when they are rotated from an inclined to a generally vertical orientation.

Figure 7:
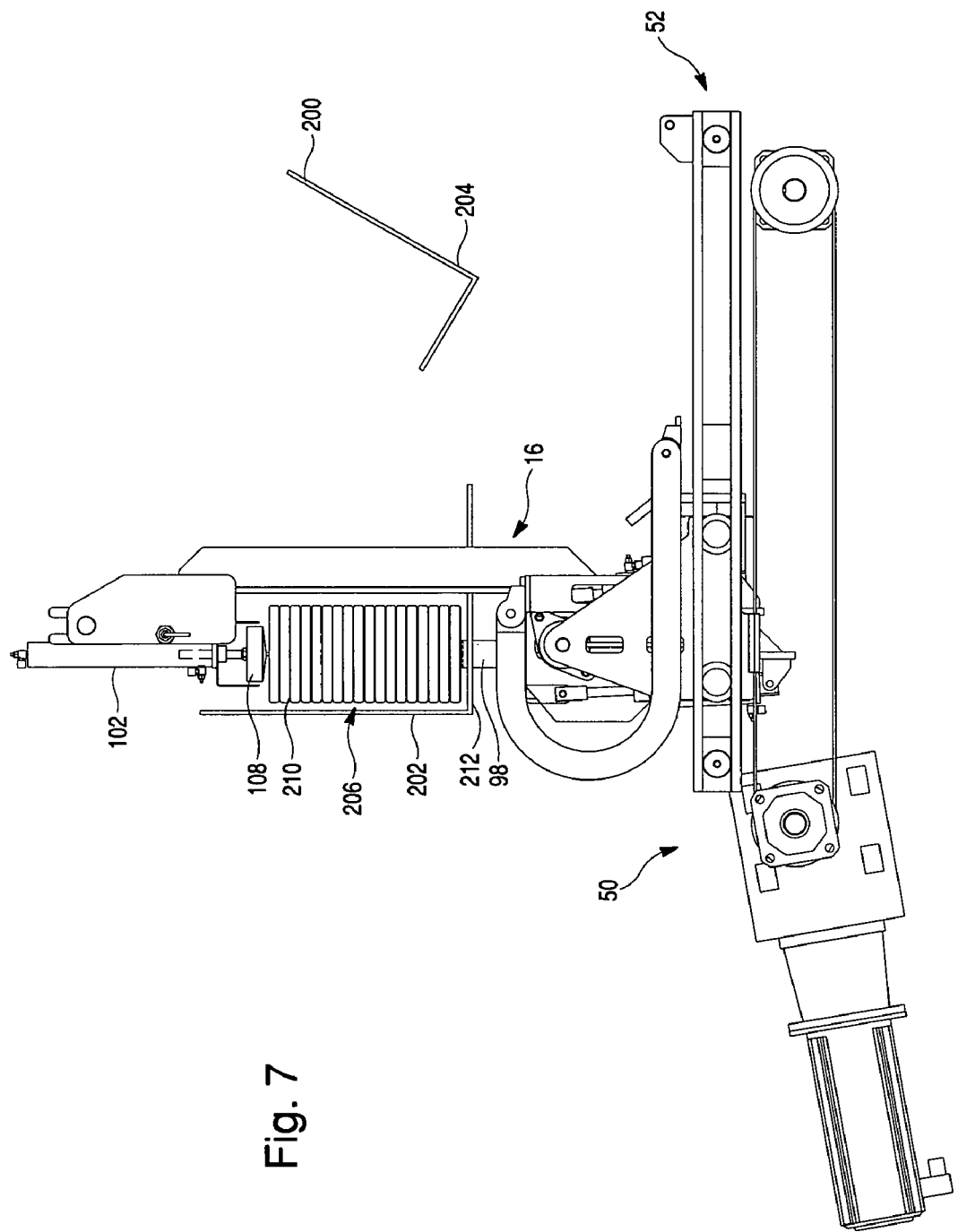
FIG. 7 is a side elevational view of the device of FIG. 1 holding a plurality of stacks of hamburger patties adjacent a horizontal support platform.

FIG. 7 shows carrier 16 after tipper 110 has pushed pivot frame 56 back to the first position and drive 14 has moved the carrier 16 to the first end 50 of the guide track 12 and positioned the bottom of stack 206 over the horizontal matrix former bottom wall 212.

Figure 8:
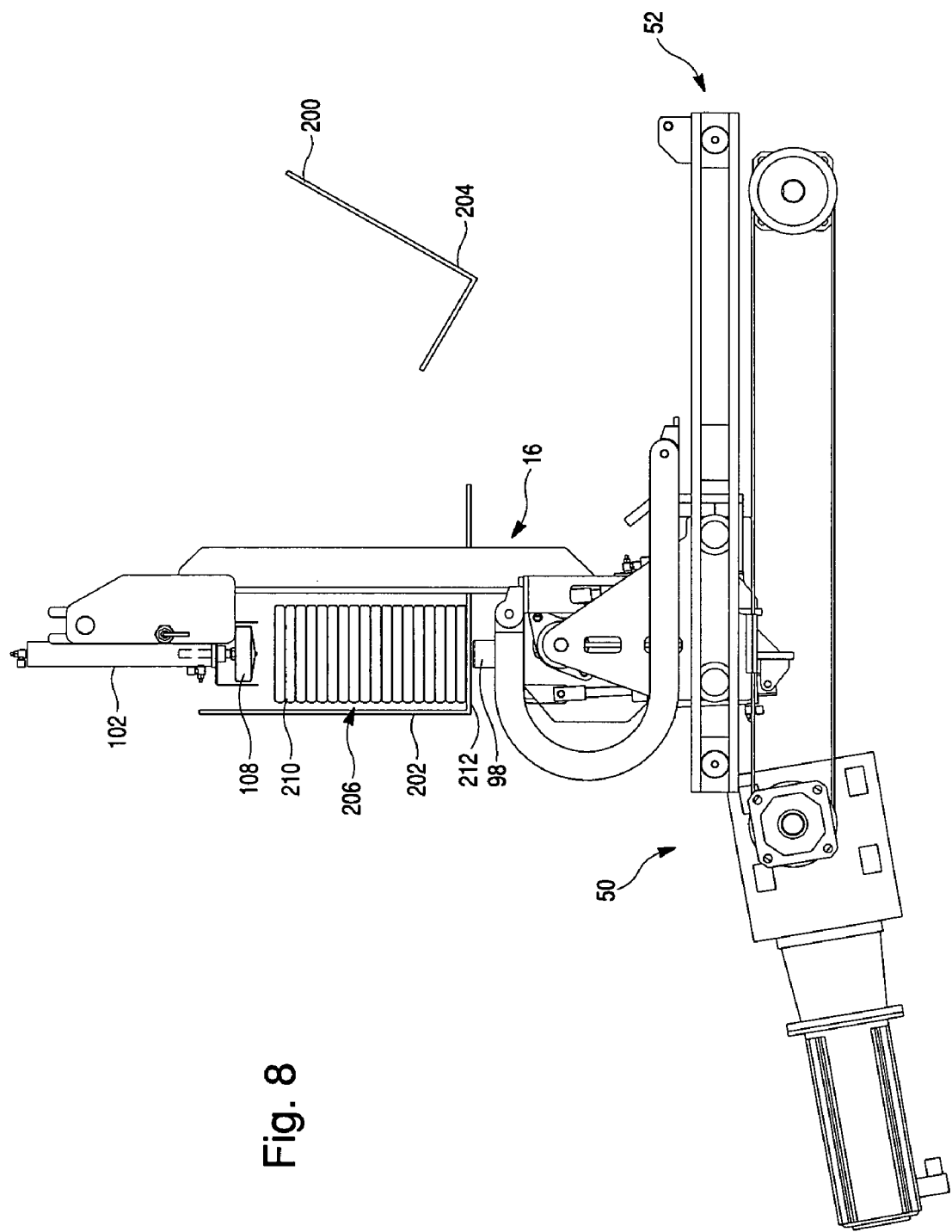
FIG. 8 is a side elevational view of the device of FIG. 1 releasing a first plurality of stacks of hamburger patties onto a horizontal support platform.
Figure 9:
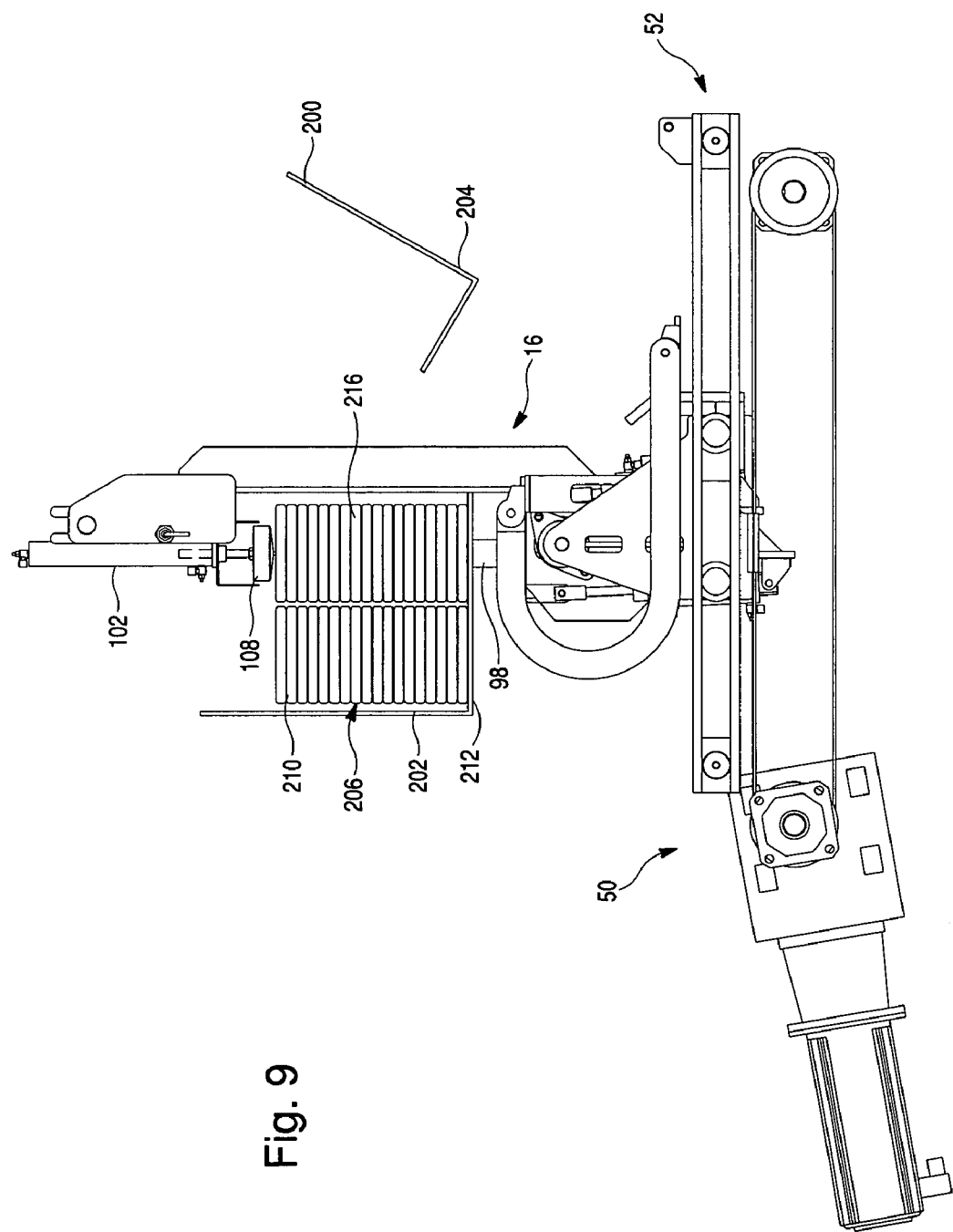
FIG. 9 is a side elevational view of the device of FIG. 1 releasing a second plurality of stacks of hamburger patties onto a horizontal support platform.

FIG. 8 shows the upper and lower grippers 90 and 88, respectively, after they have separated to release the stacks onto horizontal platform 212, while FIG. 9 shows a second stack 216 of patties about to be placed on the platform 212. The controller for the carrier can be programmed to leave additional rows of stacks at other locations if more than two rows of stacks are needed.

The subject invention has been described herein in terms of a preferred embodiment, it being understood that obvious modifications and additions to this embodiment will become apparent to those skilled in the art upon a reading of the foregoing description. It is intended that all such obvious modifications be included within the scope of this invention to the extent that they are covered by the several claims appended hereto.

What is claimed is:

1. An apparatus for transferring a plurality of stacks of discrete objects, comprising:
   a first holder at a first position configured for building said plurality of stacks of discrete objects.
   a second holder at a second position configured for receiving said plurality of stacks of discrete objects from said first holder.
   a frame having a top, a bottom, a first side and a second side, said frame pivotably moveable relative to said first holder;
   first and second guide tracks extending between said first and second holders, said frame horizontally linearly moveable back and forth along said guide tracks from said first holder to said second holder and from said second holder to said first holder;
   a plurality of stack supports on said frame bottom, wherein the position of said plurality of stack supports on said frame bottom is adjustable relative to said frame first side;
   a plurality of stack-engaging members supported by said frame top;
   at least one first actuator mounted on said frame top, said at least one first actuator operatively associated with at least one of said plurality of stack-engaging members for moving said at least one of said plurality of stack-engaging members toward and away from said stack supports;
   a second actuator for moving said frame along said guide tracks between said first holder and said second holder;
   a pivot actuator configured for said frame pivotable movement from a non-horizontal disposition of said first holder at said first position to said second holder at said second position; and
   a controller for controlling said at least one first actuator said second actuator and said pivot actuator.

2. The apparatus of claim 1 wherein said at least one first actuator comprises a plurality of actuators.

3. The apparatus of claim 2 wherein said plurality of first actuators move said stack-engaging members with respect to said frame top.

4. The apparatus of claim 3 wherein each of said plurality of first actuators is separately controllable.

5. The apparatus of claim 3 wherein said plurality of first actuators comprises a plurality of pneumatic cylinders.

6. The apparatus of claim 2 wherein said frame top includes a strut having a length and wherein said plurality of first actuators are mounted on said strut.

7. The apparatus of claim 6 wherein said plurality of first actuators are independently positionable along the length of said strut.

8. The apparatus of claim 1 including at least one third actuator for moving said plurality of stack supports relative to said frame top.

9. The apparatus of claim 1 including a frame carrier supporting said frame and a track for guiding said frame carrier between said first holder and said second holder.

10. The apparatus of claim 1 wherein said frame is rectangular and lies substantially in a single plane.

11. The apparatus of claim 1 wherein said frame comprises a support frame and a pivot frame pivotally connected to said support frame.

12. The apparatus of claim 1 including at least one drive belt supported by said guide tracks.

13. The apparatus of claim 12 wherein said frame is connected to said drive belt.

14. The apparatus of claim 1 wherein each of said stack supports on said frame bottom is aligned with one of said plurality of stack engaging members on said frame top.

* * * * *